1,963,080

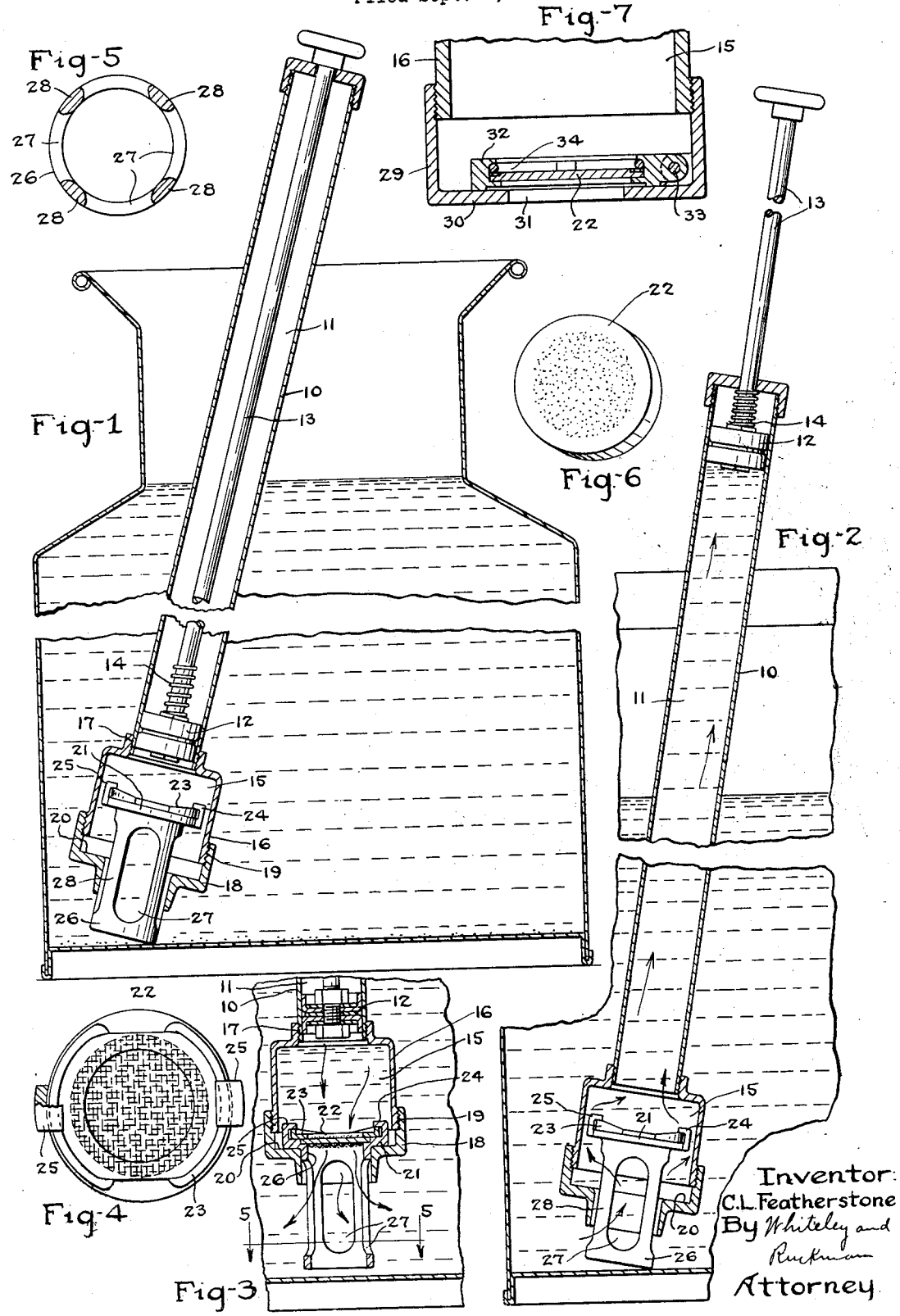
June 19, 1934. C. L. FEATHERSTONE 1,963,080
SEDIMENT TESTER FOR MILK
Filed Sept. 1, 1932
Inventor:
C. L. Featherstone
By Whiteley and
Ruckman
Attorney Patented June 19, 1934

UNITED STATES PATENT OFFICE 1,963,080

SEDIMENT TESTER FOR MILK

Charles L. Featherstone, Spokane, Wash.

Application September 1, 1932, Serial No. 631,377

3 Claims. (Cl. 23—258)

My invention relates to sediment testers for milk and has for its object to provide a simple and efficient device adapted for insertion in a can of milk whereby a measured amount taken from the bottom of the can where most of the sediment has collected may be operated upon and the amount of sediment in said measured amount be extracted.

In many States statues exist requiring periodical tests of milk furnished by dairymen to determine its sediment content. Where this is to great means are employed to require correction, or milk of that particular dairyman will be excluded from the market. Various devices have been employed, such for example as thoroughly agitating the milk in the can to insure uniform distribution of sediment and then withdrawing a measured amount of said milk and treating it to determine the amount of sediment contained therein. It is an object of my invention to obviate the necessity both of stirring the milk to distribute sediment uniformly and of withdrawing from the can any part of the milk contained therein, my device operating first to measure a desired amount of milk containing the maximum amount of sediment and then to return the milk to the can, withdrawing the sediment during the process of returning. It is a further object of my invention to provide a device for effecting the above results which will operate to take milk only from the bottom of the can where the sediment in the milk largely collects.

The full objects and advantages of my invention will appear in connection with the detailed description thereof, and the novel features of the invention are particularly pointed out in the claims.

In the drawing, which illustrates an application of my invention in one form,—

Fig. 1 is a sectional view of a milk can and my sediment collector in section therein, both partly broken away. Fig. 2 is a sectional view of the sediment collector similar to that of Fig. 1 with the parts in a different position. Fig. 3 illustrates the sediment collector valve in closed position. Fig. 4 is a top view of the sediment collector valve showing the removable screening or filtering member. Fig. 5 is a sectional plan view on line 5—5 of Fig. 3. Fig. 6 is a perspective view of one of the screening or filtering members. Fig. 7 is a sectional view of a modified valve construction.

As illustrated, the device comprises a tube 10 formed with a chamber 11 in which operates a plunger 12 slidable on a rod 13 and maintained in outer extended position by a spring 14. A valve chamber 15 is formed by a cup-piece 16 screwed on to the lower end of tube 10, as indicated at 17. A second cup-piece 18 is screwed to the outside of the cup-piece 16, as indicated at 19. And this second cup-piece forms a seat 20 for a valve head 21, which, as shown in Fig. 3, has a secondary opening adapted to receive a strainer or filter disc 22 which disc is removably held over said opening by a washer key 23 having its raised portions taking under oppositely-disposed keepers 24 and 25, as clearly shown in Figs. 3 and 4. A tubular extension 26 is connected to the valve head 21 and surrounds the central opening through it, said tubular extension being formed with a multiplicity of elongated openings 27 between intermediate posts 28, as clearly shown in Figs. 3 and 5.

The chamber 11 in the tube 10 is of a size such that when the plunger 13 is fully raised, as indicated in Fig. 2, there will be drawn into the tube and into the chamber 11 a predetermined volume of milk, as for example one pint. Owing to the fact that contact of valve extension 26 with the bottom of the cam will lift the valve head 21 to permit free flow of liquid through the bottom thereof and through the openings 27 and about the valve head 21, the milk following the line of least resistance will take this course to fill the chamber 11 in tube 10 and will not pass through the screening member 22. When the chamber 11 has been thus filled the valve member is withdrawn from the bottom of the can and the valve head drops to the position shown in Fig. 3, whereupon by use of the plunger 12 the milk is forced out of the chamber 11, passing through the strainer member 22, at which time all of the sediment in that part of the milk will be caught upon said strainer member. The device is then withdrawn from the milk, the removable cup 18 unscrewed and the valve head 21 thereby released, from which the removable strainer is withdrawn and the amount of sediment thereon calculated in a well-known way. From this data the relative percentage of sediment in the milk can be determined.

In the form of the invention shown in Fig. 7, the cup 16 has secured to its lower end a valve casing 29 having a lower wall 30 in which is a circular opening 31. A flap valve 32 is hinged at 33 and is lifted by the incoming milk when the plunger 12 is drawn upward. The valve member 32 carries a removable strainer member 22 which is held in position by a snap ring 34. In this form of the invention there is not any opening of the valve effected by contact with the bottom of the can, but the valve opening is brought about by the suction from the operation of the punger 12.

I claim:

1. A sediment collector for milk, comprising a tube, a self-closing valve at the bottom of said tube having a removable strainer top, means for drawing milk into the tube past said valve, said means and tube being constructed and arranged to draw in a measured amount of milk, said means thereafter operating to expel the milk from the tube through the removable strainer top, whereby the sediment in the milk is collected.

2. A sediment collector for milk, comprising a tube of a length sufficient to extend from the bottom to the outside of a can of milk and having a diameter such that when the tube is filled it will contain a measured amount, a self-closing valve, having a removable strainer top, at the bottom of said tube, means for drawing milk into the tube past the valve to fill the tube, and thereafter for expelling it from the tube through the strainer top, whereby the sediment is collected.

3. A sediment collector for milk, comprising a tube, a self-closing valve at the bottom of the tube having a removable strainer top carried thereby, means for drawing milk into the tube past the valve and for expelling it from the tube through the strainer top, whereby the sediment is collected on the strainer, and means for holding the valve for ready removal, whereby the strainer top may be removed.

CHARLES L. FEATHERSTONE.